E. FAISON.
AUTOMOBILE LOCK.
APPLICATION FILED NOV. 9, 1920.

1,401,971.

Patented Jan. 3, 1922.

Inventor
Elliott Faison,
By Geo. P. Kimmel, Attorney

UNITED STATES PATENT OFFICE.

ELLIOTT FAISON, OF TARBORO, NORTH CAROLINA.

AUTOMOBILE LOCK.

1,401,971. Specification of Letters Patent. Patented Jan. 3, 1922.

Application filed November 9, 1920. Serial No. 422,801.

*To all whom it may concern:*

Be it known that I, ELLIOTT FAISON, a citizen of the United States, residing at Tarboro, in the county of Edgecombe and State of North Carolina, have invented certain new and useful Improvements in an Automobile Lock, of which the following is a specification.

This invention relates to a wheel locking device for automobiles.

The object of the invention is to provide a combined wheel and tire lock and mud chain for automobiles to protect the car against thieves.

Another object is to provide a chain forming a part of the lock and equipped with means whereby it may be used as a mud chain in case of an emergency.

With these and other objects in view, the invention consists in certain novel features of construction as hereinafter shown and described, and specifically pointed out in the claims.

Figure 2:
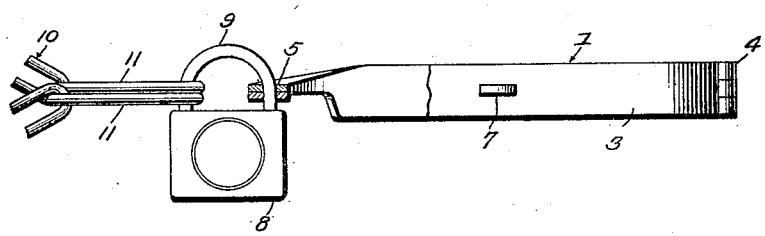
Fig. 2 is an enlarged detail sectional view of a portion of the locking means.
Figure 3:
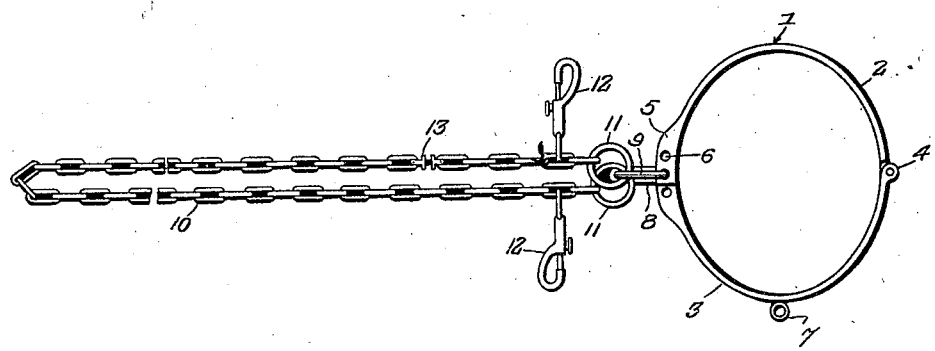
Fig. 3 is a plan view of the attachment detached, with the spare tire chain removed.
Figure 4:
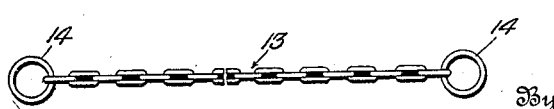
Fig. 4 is a similar view of the spare tire chain detached.

In the embodiment illustrated the attachment constituting this invention comprises a metal band 1 composed of two sections 2 and 3 hingedly connected at one end as shown at 4 with their free ends 5 flattened and provided with a plurality of apertures 6 which are designed to register when the ends are overlapped as shown in Figs. 2 and 3 for the passage through said registering apertures of the shackle 9 of a padlock 8. One of the sections of the band 1 has a laterally extending eye 7 for attachment of the chain 10 when not in use.

Figure 1:
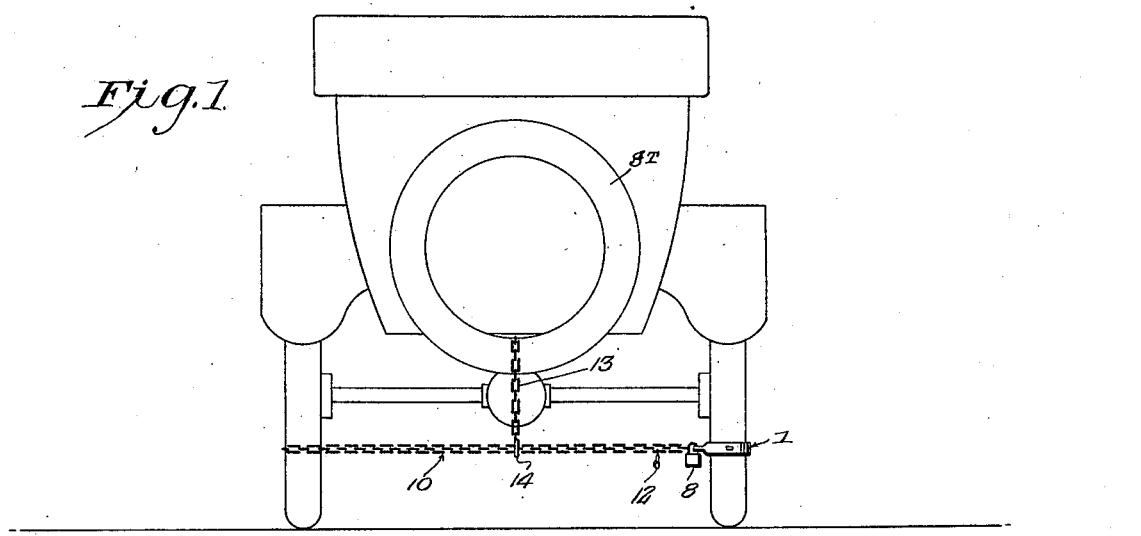
Figure 1 represents a rear elevation of an automobile with this improved lock shown applied.

The band 1 is designed to be fastened around the wheel rim and tire as shown in Fig. 1 and to have connected therewith by means of the padlock 8 a chain 10 which may be secured to any fixed part of the car being especially designed for passage around another wheel on the opposite side of the car as shown in Fig. 1 and when the padlock connects the rings 11 carried by the ends of said chain with the lapped ends of the band it will be impossible for the car to be driven off or a tire or wheel removed. The chain 10 preferably has a swivel 13 formed intermediate its ends to permit it to be turned without becoming entangled and connected near the rings 11 thereof are two snap hooks 12 which are designed for use when the chain is employed for an anti-skidding or mud chain. It is of course understood that when the chain is used for this purpose it is disconnected from the band 1.

To render the device thief-proof it is necessary that the links of chain 10 be sufficiently large and strong to prevent them being separated or broken by ordinary tools or by filing of a link.

Adapted to be carried by chain 10 and engaged with a spare tire ST is a short chain 13 having attaching rings 14 at its ends. This chain 13 as shown in Fig. 1 after being passed around the tire ST mounted on the holder at the rear of the car has its ends engaged with chain 10 so that all possibility of the spare tire being stolen is prevented and this chain also operates to hold chain 10 against sagging.

The preferred embodiment of the invention is disclosed in the drawings and set forth in the specification, but it will be understood that any modifications within the scope of the claimed invention may be made in the construction without departing from the principle of the invention or sacrificing any of its advantages.

What is claimed is:

1. In a lock of the class described, a rim and tire encircling split band having apertured overlapping free ends, a chain having rings at its ends and a padlock having a shackle for passage through said rings and through the apertures in the lapped ends of said band to secure the chain to the band and the band in closed position.

2. In a lock of the class described, a rim and tire encircling split band having flat apertured overlapping free ends, a chain having rings at its ends and a swivel intermediate its ends, and a padlock having a shackle for passage through said rings and the apertures in said lapped band ends to secure the chain to the band and the band in closed position.

3. In a lock of the class described, a rim and tire encircling split band having apertured overlapping free ends, a chain having rings at its ends, and a padlock having a shackle for passage through said rings and through the apertures in the lapped ends of said band to secure the chain to the band and the band in closed position, and snap hooks carried by the chain to adapt it for use as a mud chain.

4. A lock of the class described comprising a chain of a length when doubled to span the space between two wheels on opposite sides of a car and to be looped around the rim of one of them, said chain having attaching rings at its ends, and means for securing said rings to the rim of the opposed wheel.

5. A lock of the class described comprising a chain of a length when doubled to span the space between two wheels on opposite sides of a car and to be looped around the rim of one of them, said chain having attaching rings at its ends, means for securing said rings to the rim of the opposed wheel, and an auxiliary chain carried by said first mentioned chain and adapted to extend at an angle thereto and be looped around a spare tire mounted on the rear of the car for securing said tire against removal.

In testimony whereof, I affix my signature hereto.

ELLIOTT FAISON.